US012618864B2

(12) United States Patent
Szulga et al.

(10) Patent No.: US 12,618,864 B2
(45) Date of Patent: May 5, 2026

(54) AERODYNAMIC MEASUREMENT PROBE

(71) Applicant: THALES, Meudon (FR)

(72) Inventors: Natacha Szulga, Chatellerault (FR); François Perez, Chatellerault (FR); Eric Loil, Chatellerault (FR); Frédéric Sadrin, Vendôme (FR); Jocelyn Be, Vendôme (FR); Jean-Luc Vallee, Chatellerault (FR); Tristan Guillabeau, Chatellerault (FR)

(73) Assignee: THALES, Meudon (FR)

( * ) Notice: Subject to any disclaimer, the term of this patent is extended or adjusted under 35 U.S.C. 154(b) by 282 days.

(21) Appl. No.: 18/563,827

(22) PCT Filed: May 20, 2022

(86) PCT No.: PCT/EP2022/063759
§ 371 (c)(1),
(2) Date: Nov. 22, 2023

(87) PCT Pub. No.: WO2022/248360
PCT Pub. Date: Dec. 1, 2022

(65) Prior Publication Data
US 2024/0241150 A1 Jul. 18, 2024

(30) Foreign Application Priority Data
May 27, 2021 (FR) ...................................... 2105489

(51) Int. Cl.
*G01P 13/02* (2006.01)
*G01P 5/06* (2006.01)

(52) U.S. Cl.
CPC .............. *G01P 13/025* (2013.01); *G01P 5/06* (2013.01)

(58) Field of Classification Search
CPC .................................. G01P 5/06; G01P 13/025
See application file for complete search history.

(56) References Cited

U.S. PATENT DOCUMENTS

| | | | | |
|---|---|---|---|---|
| 6,612,166 | B2 * | 9/2003 | Golly .................... | G01P 13/025 73/861.74 |
| 6,941,805 | B2 * | 9/2005 | Seidel ................... | G01P 13/025 73/182 |
| 9,233,760 | B2 * | 1/2016 | Perju ..................... | G01P 13/025 |
| 10,393,766 | B2 | 8/2019 | Alcaya et al. | |

(Continued)

FOREIGN PATENT DOCUMENTS

EP 2 851 689 A1 3/2015

*Primary Examiner* — Jill E Culler
(74) *Attorney, Agent, or Firm* — BakerHostetler

(57) ABSTRACT
An aerodynamic measurement probe intended to measure a local angle of attack of an air stream flowing along the fuselage of an aircraft, includes a support and a shaft that is able to rotate about a longitudinal axis with respect to the support, the support and the shaft being configured to form between them a gap, passing around an annular tab at the end of the shaft in the support, making it possible to maintain a functional clearance to allow one end of the shaft to pivot freely in the support, and communicating with an impurity discharge circuit, the gap comprising an inner annular groove about the axis of rotation, made in the support, and opening out away from the axis directly onto the end part of the annular tab, the profile of the inner groove being rounded.

16 Claims, 4 Drawing Sheets

(56)     References Cited

U.S. PATENT DOCUMENTS

| | | |
|---|---|---|
| 2004/0188945 A1 | 9/2004 | Poincet et al. |
| 2015/0082878 A1 | 3/2015 | Bigand |
| 2016/0033356 A1 | 2/2016 | Deangelo et al. |
| 2019/0242924 A1* | 8/2019 | Lang ........................ G01P 5/16 |

\* cited by examiner

AERODYNAMIC MEASUREMENT PROBE

CROSS-REFERENCE TO RELATED APPLICATIONS

This application is a National Stage of International patent application PCT/EP2022/063759, filed on May 20, 2022, which claims priority to foreign French patent application No. FR 2105489, filed on May 27, 2021, the disclosures of which are incorporated by reference in their entireties.

FIELD OF THE INVENTION

The invention relates to an aerodynamic measurement probe intended to measure a local angle of attack of an air stream flowing along the fuselage of an aircraft, in particular an angle-of-attack (AOA) probe or a side-slip angle (SSA) probe.

BACKGROUND

According to one known technique, aerodynamic measurement probes intended to measure an angle of attack (AOA) or a side-slip angle (SSA) comprise a rotatable assembly intended to be oriented in line with the air stream surrounding the aircraft on which the support, fixed or rigidly connected to the fuselage, is installed. The measurement of the local angle of attack of an air stream on the fuselage of an aircraft is an essential parameter for piloting the latter. It makes it possible to define the direction of the velocity vector of the aircraft with respect to the ambient air flow surrounding it.

The use of a movable assembly poses the problem of sealing the movable assembly with respect to its support, embedded in the fuselage of the aircraft. Means must be provided for preventing or limiting the penetration of liquid or other foreign bodies into the mechanism of the probe.

Various solutions comprising sealed bearings, involving dry friction or viscous friction, have been envisaged to overcome this difficulty. These solutions offer variable sealing performance and can be dimensioned in accordance with the requirements of the aircraft.

Impurities can reach these bearings and seize or jam them. To prevent this, it is possible to seal the gap with a deformable protector, to the detriment of the measurement accuracy/sensitivity, or to allow foreign bodies to enter, and manage the discharge thereof.

However, dry or viscous friction between the pin and the support generates torque that resists the rotation of the movable assembly. To meet the most stringent requirements in terms of the accuracy and response time of aerodynamic probes, the use of pins that rotate in a frictionless manner with respect to the support has been envisaged. To allow the pin to rotate freely, the rotating pin is connected to the support by a set of bearings for guiding in rotation, without seals or other sealing means in contact with the pin. It is therefore accepted that impurities, such as water droplets, ice particles, grains of sand, dust, soot particles, etc., can penetrate at the interface between the pin and the support.

For these devices having a pin that rotates in a frictionless manner, there is nevertheless a desire to limit the quantity of penetrating impurities.

Aircraft are subject to extreme environments in which soot, dust and ice particles and/or water droplets are borne by the fluid flow. Probes must be robust to withstand these environments. The DO-160 approval tests set out for example extreme test conditions (sand and dust, water ingestion, icing) that the probes must withstand in order to demonstrate their robustness in operational conditions.

Known AOA probe C16291AB, developed by Thales, has a very large functional clearance between the mounting plate and the rotating part. This functional clearance communicates with a void situated under the mounting plate. The drain hole is systematically pointing downward. The large size of the functional clearance prevents the rotating part from being jammed by a build-up of small particles (or by the larger particles of the DO-160 sand tests). The large void volume under the mounting plate "stores" the particles without the risk of jamming the rotating part if the discharge speeds of the drain hole are insufficient.

The management of the particles ingested by this probe is based on the functional clearance between the movable part and the fixed part. This clearance, which is large compared to the dimensions of the particles usually encountered, prevents the vane from being jammed by solid particles. However, this large clearance promotes intense heat exchanges with the air at the base of the vane. This makes this first solution vulnerable to icing.

U.S. Ser. No. 10/393,766 B2 is also known, which discloses a system for managing water entering an angle-of-attack probe. A solution with four drain holes is disclosed, two of which are always pointing downward. The functional clearance of the probe is connected to all of the drain holes by a significant volume under the fixed part of the probe. In the same way, this large volume stores water if the exit speeds of the drain holes are insufficient. It must be noted that this system for managing the water ingested by the probe allows water to access the electronic unit of the probe in certain situations.

Such a probe addresses the problem of managing water entering through the drain holes. It does not address the problem of the intrusion of solid particles inside the probe, or the problems of icing.

EP 2851689 is also known, which discloses a solution for guiding the water ingested by an angle-of-attack probe via its functional clearance to the drain holes, which discharge it. The proposed solution is based on the shape of the base of the rotating element and of the fixed part. The gap between these two parts then forms several channels that guide the water ingested preferably toward the drain holes rather than toward the bearings that rotate the movable part.

Such a probe has a shape that can only be produced by 3D printing as it appears to be impossible to produce using conventional machining techniques. Such a probe has a shape that can only be produced by 3D printing as it appears to be very difficult to produce using conventional machining techniques, and in any case at an excessive cost. However, this manufacturing technique has not yet been approved for the field of aeronautics. In addition, the small channels can be vulnerable to the ingestion of sand, and lead to a risk of blockage.

SUMMARY OF THE INVENTION

One aim of the invention is to propose a probe that overcomes the aforementioned drawbacks and particularly the problems of icing and discharge of the impurities.

According to one aspect of the invention, an aerodynamic measurement probe is proposed that is intended to measure a local angle of attack of an air stream flowing along the fuselage of an aircraft, comprising a support and a shaft that is able to rotate about a longitudinal axis with respect to the support, the support and the shaft being configured to form between them a gap, passing around an annular tab at the end of the shaft in the support, making it possible to maintain a functional clearance to allow one end of the shaft to pivot freely in the support, and communicating with an impurity discharge circuit, the gap comprising an inner annular groove about the axis of rotation, made in the support, and opening out away from the axis directly onto the end part of the annular tab, the profile of the inner groove being rounded.

Impuriticles is given to mean water droplets, ice particles, grains of sand, dust, soot particles, etc.

Such a probe provided with such an inner annular groove promotes the development of a vortex without promoting the storage of sand directly under the foot of the movable shaft or vane (proximity of the axis of rotation). It more particularly makes it possible to protect the bearings allowing the shaft to rotate.

In addition, the presence of such a tab makes it possible to prevent the flow from entering through the drain holes instead of exiting.

A rounded profile promotes the development of a vortex without promoting the storage of sand directly under the foot of the shaft.

According to one embodiment, the gap further comprises an outer annular groove, about the axis of rotation, made in the support, and opening out toward the axis, so that the annular tab is positioned directly between the inner and outer grooves.

This outer groove allows the creation of a vortex near the entrance to the gap, and conveys the impurities toward the drain holes.

According to one embodiment, the profile of the outer groove is rectangular.

A rectangular profile makes it possible to maximize the space for storing sand between two successive cleaning operations.

In one embodiment, the rectangular profile of the outer groove has a height of between 1.5 mm and 4 mm, and preferably a height of 3 mm.

These dimensions allow an excellent compromise between satisfactory ice resistance (convection is limited and there is space for an optional heater), and the possibility of storing sand between two successive cleaning operations. These dimensions also allow the development of the vortex that promotes the discharge of the impurities.

According to one embodiment, the rectangular profile of the outer groove has a depth of between 3 mm and 7 mm, and preferably a depth of 4.5 mm.

These dimensions also allow an excellent compromise between satisfactory ice resistance (convection is limited and there is space for an optional heater), and the possibility of storing sand between two successive cleaning operations. These dimensions also allow the development of the vortex that promotes the discharge of the impurities.

According to one embodiment, the rounded profile of the inner groove has a diameter of between 2 and 5 mm, and preferably a diameter of 3.2 mm.

These dimensions allow an excellent compromise between the space between the fixed support of the probe and the base of the movable shaft, the barrier effect against impurities, and the functional clearance, which must be large enough for the performance in terms of accuracy.

According to one embodiment, the profile of the inner groove is rectangular.

A rectangular profile makes it possible to store more sand before the rotation mechanism.

According to one embodiment, the profile of the rectangular inner groove has a height of between 2 mm and 5 mm.

These dimensions also allow an excellent compromise between the space between the fixed support of the probe and the base of the movable shaft, the barrier effect against impurities, and the functional clearance, which must be large enough for the performance in terms of accuracy.

In one embodiment, the gap comprises a substantially straight first part, having a width of between 1 mm and 5 mm, and preferably having a width of 1.2 mm, between the part of the gap emerging into the open air and the outer groove.

This makes it possible to prevent air being sucked in through the drain holes of the impurity discharge circuit and to let through the larger impurities such as sand (in accordance with regulation DO-160).

According to one embodiment, the gap comprises a substantially straight second part, between the outer groove and the inner groove, having a width of between 0.5 mm and 1 mm, and preferably having a width of 0.65 mm.

These dimensions make it possible to ensure measurement accuracy.

In one embodiment, the gap comprises a substantially straight third part, positioned between the inner groove and a fourth part of the gap in contact with mechanical elements of the movable shaft allowing the rotation thereof, having a width of between 0.5 mm and 1 mm, and preferably having a width of 0.65 mm.

These dimensions allow an excellent compromise between the space between the fixed support of the probe and the base of the movable shaft, the barrier effect against impurities, and the functional clearance, which must be large enough for the performance in terms of accuracy.

BRIEF DESCRIPTION OF THE DRAWINGS

The invention will be better understood on examining various embodiments described by way of non-limiting example and illustrated by the appended drawings, in which.

In all of the FIGURES, elements with identical reference signs are similar.

DETAILED DESCRIPTION

In the present description, the embodiments described are non-limiting, and the features and functions well known to a person skilled in the art are not described in detail.

Figure 1:
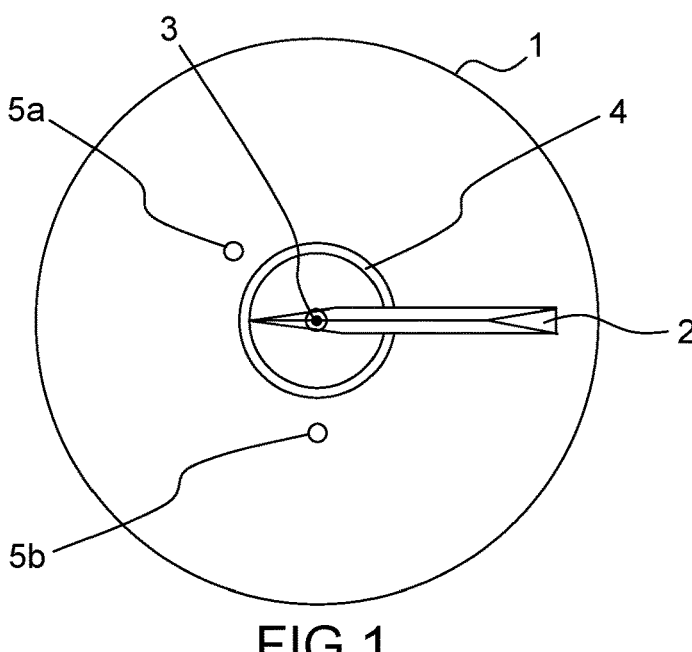
FIG. 1 schematically illustrates an exterior view of the aerodynamic measurement probe, according to one aspect of the invention.

FIG. 1 schematically shows an aerodynamic measurement probe intended to measure a local angle of attack of an air stream flowing along the fuselage of an aircraft, comprising a support 1, in this instance circular in shape, and a shaft 2 that is able to rotate about a longitudinal axis 3 with respect to the support 1.

The solution proposed for managing the ingestion of impurities by an aerodynamic measurement probe is based on the design of the functional clearance between the movable shaft or vane 2 and the heating body, and of the drain holes. The proposed design makes it possible to simultaneously manage the ingestion of ice crystals, water droplets and solid particles such as volcanic ash, dust or grains of sand, etc. (defined by DO-160, which defines the test procedures for equipment on board an aircraft).

FIG. 1 shows the exterior of an aerodynamic measurement probe and highlights the gap 4 between the support 1 and the movable shaft 2, which passes around an annular tab 2a at the end of the shaft 2 in the support 1. When the probe is placed in an air flow, the air enters through the front part of the gap 4 and leaves through the drain holes of an impurity discharge circuit 5, in this case two drain holes 5a and 5b, and through the rear part of the gap 4.

For example, the drain holes 5a and 5b are positioned so that one of the two can always be situated toward the bottom (direction of gravity), whether the probe is mounted on the right or left of the aircraft. FIG. 1 shows a situation in which the drain hole 5b is situated toward the bottom. This makes it possible to discharge by gravity the impurities that enter the probe when the aircraft is stopped or taxiing.

Figure 2:
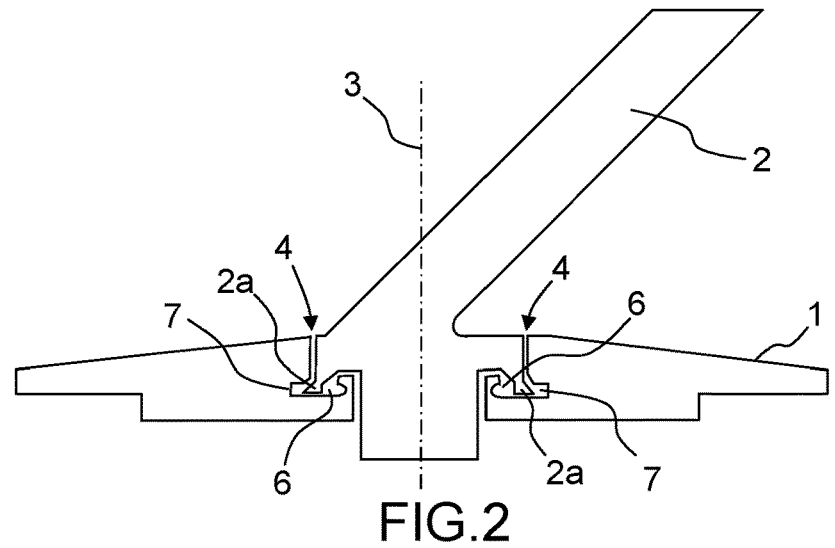
FIG. 2 schematically illustrates a cross-sectional view of the aerodynamic measurement probe that does not pass through the drain holes of the impurity discharge circuit, according to one aspect of the invention.
Figure 3:
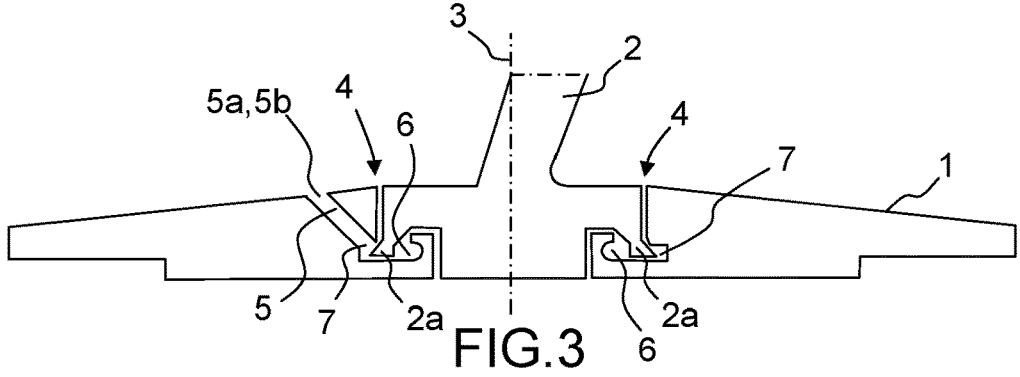
FIG. 3 schematically illustrates a cross-sectional view of the aerodynamic measurement probe that passes through the drain holes of the impurity discharge circuit, according to one aspect of the invention.

FIG. 2 shows a cross-sectional view of the aerodynamic measurement probe, which does not pass through the drain holes 5a, 5b of the impurity discharge circuit, and FIG. 3 shows a cross-sectional view of the aerodynamic measurement probe, which does not pass through the drain holes 5a, 5b of the impurity discharge circuit, according to one aspect of the invention. These cross-sections pass through the plane of symmetry of the movable shaft or vane 2.

The gap 4 comprises an inner annular groove 6 about the axis of rotation, made in the support 1 and opening out away from the axis.

Figure 4:
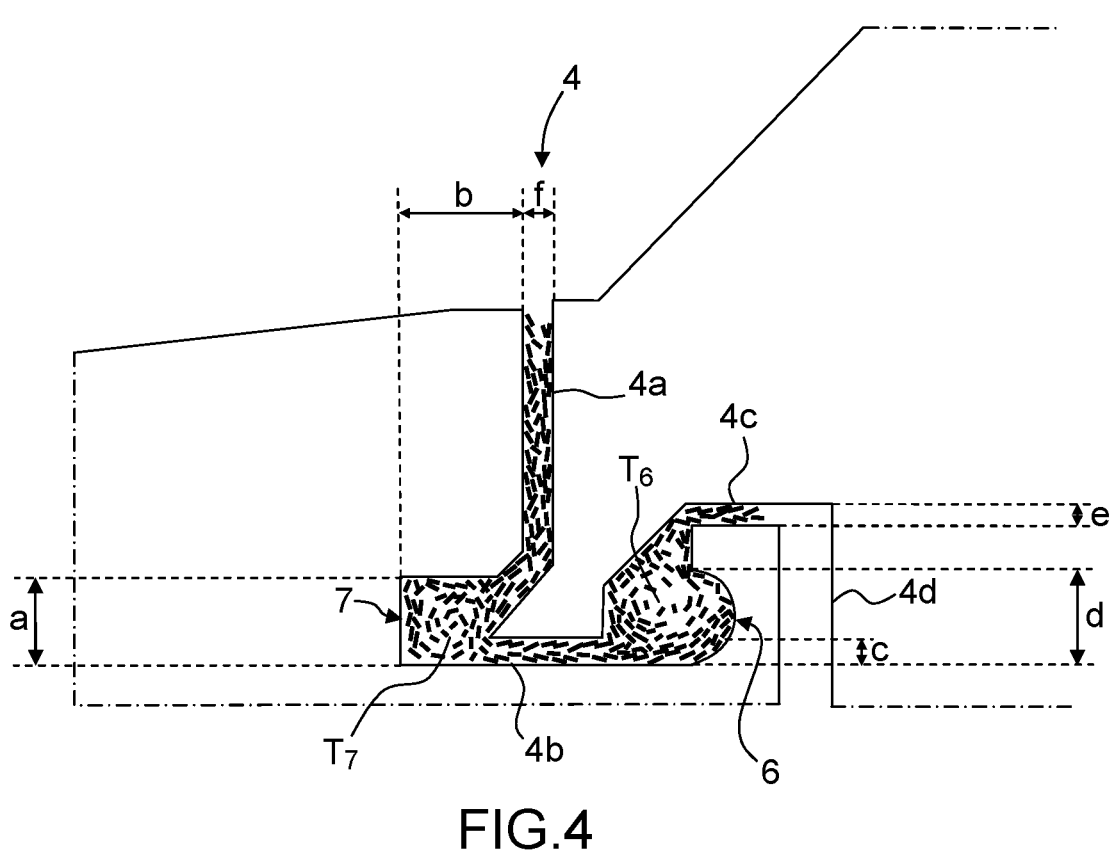
FIG. 4 schematically illustrates a cross-sectional view of the aerodynamic measurement probe in line with the gap between the support and the rotating shaft with velocity fields projected in the section plane, according to one aspect of the invention.

FIG. 4 shows the gap 4 in greater detail.

As illustrated in FIGS. 2, 3 and 4, the start of the gap 4 between the foot of the rotating shaft 2 and the fixed support 1 is substantially straight, having a constant width that makes it possible to avoid air being sucked in through the drain holes.

Optionally, the gap 4 can further comprise an outer annular groove 7, about the axis of rotation 3, made in the support and opening out toward the axis. In a non-limiting manner, the figures described in the present description comprise such an outer annular groove 7.

The end of the shaft 2 in the support can further comprise an annular tab 2a positioned between the inner 6 and outer 7 grooves.

The ingestion of airborne sand through the gap 1 must not jam the rotation of the movable shaft 2. It must therefore let through the largest grains of sand. Standard DO-160 states a maximum grain size of the order of 1 mm. The minimum width of the gap 4 must thus be slightly greater than 1 mm. On the other hand, for thermal protection reasons, the width of the gap 4 must be as small as possible. A maximum acceptable value for this width is 5 mm.

Considering the direction of flow, the gap 4 comprises a substantially straight first part, upstream of the first groove, having a width of between 1 mm and 5 mm, and preferably having a width of 1.2 mm.

This substantially straight first part emerges into the outer groove 7.

The outer annular groove 7 can have a rectangular profile, having a height of between 1.5 mm and 4 mm, preferably 3 mm, and a depth of between 3 mm and 7 mm, preferably 4.5 mm.

There is then a substantially straight second part 4b, between the outer groove 7 and the inner groove 6, having a width of between 0.5 mm and 1 mm, preferably 0.65 mm.

The gap 4 comprises a substantially straight third part 4c, positioned downstream of the inner groove 6, and upstream of a fourth part 4d in contact with mechanical elements of the movable shaft 2 allowing the rotation thereof, having a width of between 0.5 mm and 1 mm, and preferably having a width of 0.65 mm.

The first part of the gap 4 communicates directly with the outer groove 7. This is a cylindrical groove that makes a complete turn around the heating body (symmetry of revolution), not shown in the figures.

The profile of the inner groove 6 is for example rounded or rectangular.

If it is rounded, the profile of the inner groove 6 has a diameter of between 2 and 5 mm, and preferably a diameter of 3.2 mm.

If it is rectangular, the profile of the inner groove 6 has a height of between 2 mm and 5 mm.

The sudden change in cross-section between the gap 4 and the outer groove 7 results in the formation of a recirculation vortex T7 inside the outer groove 7, as illustrated in FIG. 4. It originates inside the outer groove 7 directly below the leading edge of the movable shaft 2 along its axis of rotation and then develops on either side of this element to the drain holes 5a and 5b. This vortex T7 therefore guides any impurities that enter through the upstream part of the gap 4 toward the drain holes 5a, 5b.

The rounded (teardrop shaped) or rectangular profile of the inner groove 6 generates another vortex T6, counter-rotating with respect to the vortex T7 of the outer groove 7. Like the vortex T7, the vortex T6 originates at the furthest upstream point of the geometry. It develops to the downstream part of the probe where the flow, and the impurities it is carrying, are discharged.

Some impurities might not be guided toward a drain hole 5a, 5b by the vortex T7, and so continue on their path under the shaft 2. They then meet the upper chicane or inner groove 6, which is the last obstacle preventing the intrusion of impurities into the mechanism of the shaft 2, and therefore the jamming thereof. It must be as high as possible, without however hindering the rotation of the movable shaft 2 of the probe.

The foot of the shaft 2 extends slightly beyond the fixed support so that a stopping point of the flow is situated on the probe foot. As a result, the flow enters under the probe foot through the upstream half-portion of the gap 4 and exits through the downstream half-portion of the gap and through the drain holes 5a, 5b.

Figure 5A:
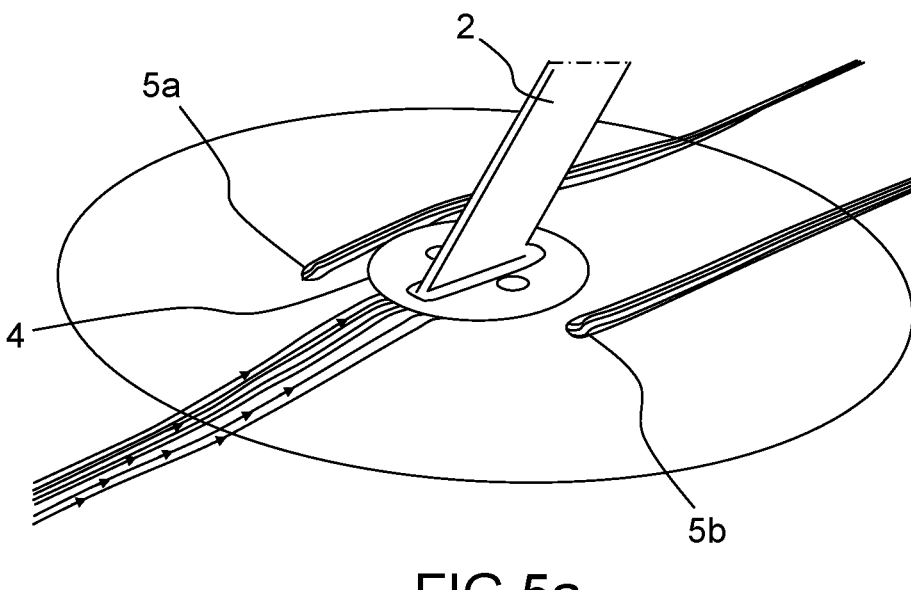
FIG. 5a schematically illustrates an exterior view of the streamlines of the air flow leaving the drain holes of the impurity discharge circuit, according to one aspect of the invention.
Figure 5B:
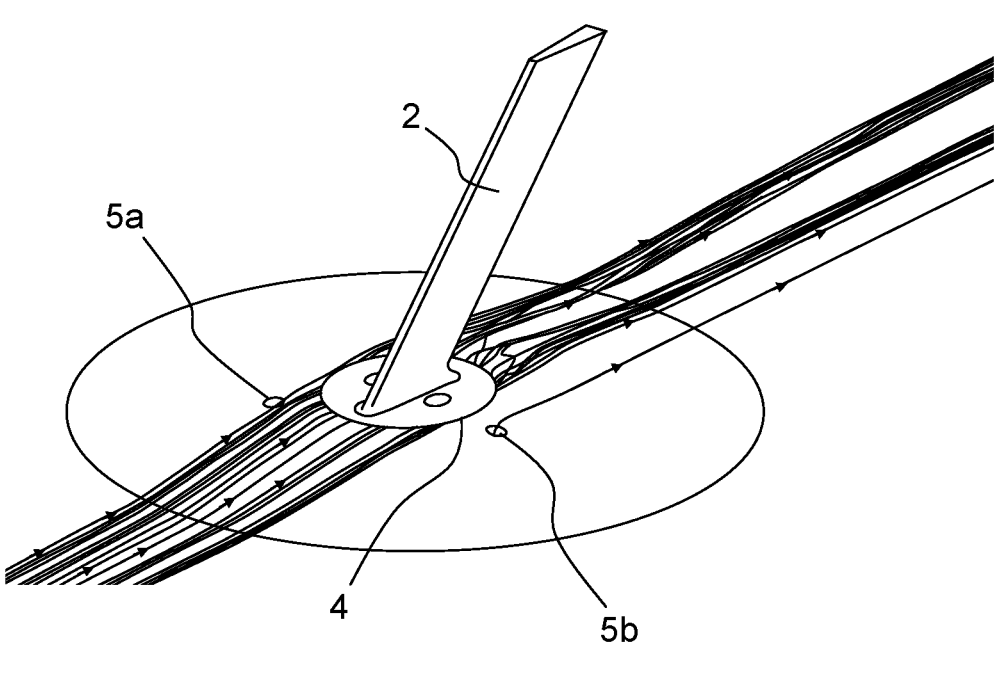
FIG. 5b schematically illustrates an exterior view of the streamlines of the air flow leaving the rear part of the gap, according to one aspect of the invention.
Figure 6A:
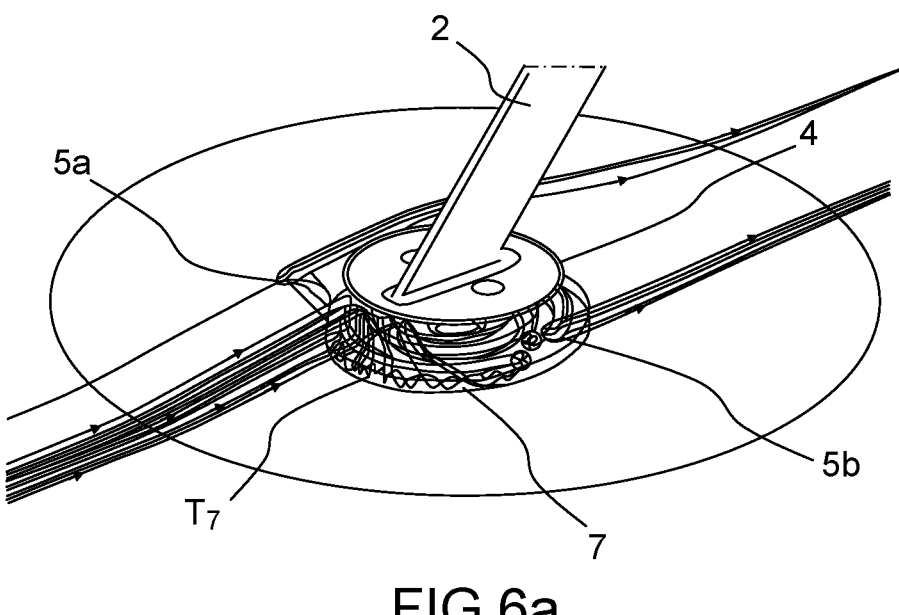
FIG. 6a schematically illustrates an interior view of the streamlines of the air flow leaving the drain holes of the impurity discharge circuit, according to one aspect of the invention.
Figure 6B:
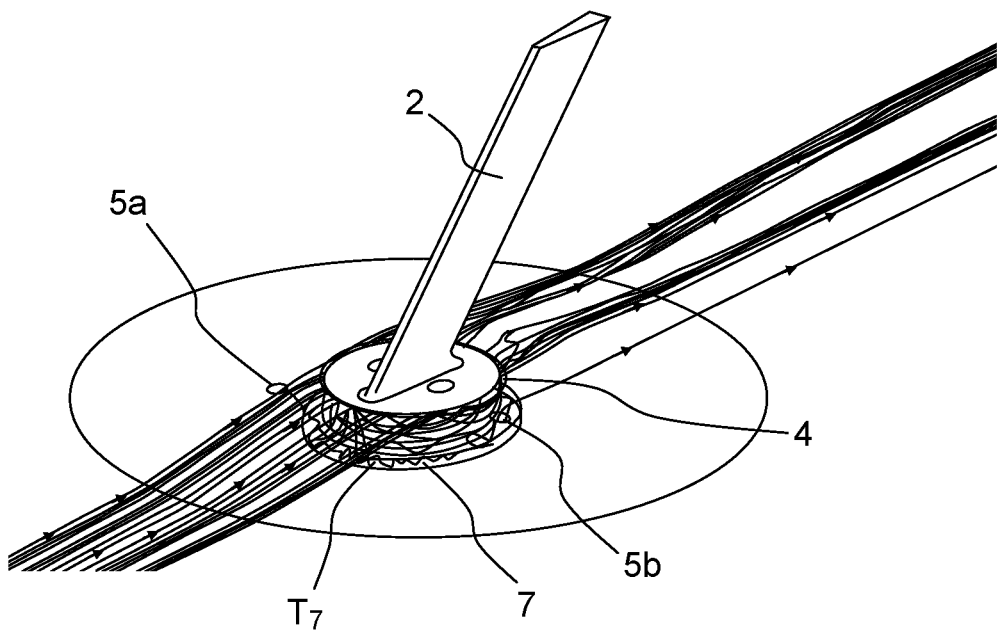
FIG. 6b schematically illustrates an interior view of the streamlines of the air flow leaving the rear part of the gap, according to one aspect of the invention.

The connection between the drain holes and the rest of the impurity discharge system is shown in FIG. 5a and FIG. 5b, as well as in FIG. 6a and FIG. 6b.

FIG. 5a shows the streamlines of the flow passing through the drain holes 5a, 5b. Before exiting the holes, the flow arrives from the bottom left of FIG. 5a and follows the direction of the arrows. It enters through the upstream part of the gap 4 and then flows in the grooves 7 and/or 6 before exiting through the drain hole 5a and/or through the drain hole 5b.

FIG. 5b supplements FIG. 5a, as showing everything in the same figure would be illegible. FIG. 5b shows the streamlines of the flow passing through the rear part of the gap 4.

FIG. 6a shows in interior view of the streamlines of the air flow passing through the drain holes of the impurity discharge circuit.

FIG. 6b supplements FIG. 6a, as showing everything in the same figure would be illegible. FIG. 6b shows an interior view of the streamlines of the air flow passing through the rear part of the gap 4.

The invention claimed is:

1. An aerodynamic measurement probe to measure a local angle of attack of an air stream flowing along an aircraft fuselage, said probe comprising:

a support and a shaft, said shaft being able to rotate about a longitudinal axis with respect to the support, the support and the shaft being configured to form between them a gap, said gap passing around an annular tab of an end of the shaft in the support, maintaining a functional clearance allowing said end of the shaft to pivot freely in the support, and said gap communicating, through an annular groove with drain holes of an impurity discharge circuit, the gap comprising an inner annular groove about the longitudinal axis, the inner groove being made in the support, and the inner groove opening out away from the axis directly onto an end part of the annular tab, wherein the gap further comprises said outer annular groove, about the longitudinal axis, made in the support, and opening out toward the axis, so that the annular tab is positioned directly between the inner and outer grooves;

the outer groove, the tab, the inner groove and a chicane downstream the inner groove protecting mechanical rotation elements of the probe from impurities, impurities being drained through the drain holes away from said mechanical rotation elements to be discharged by gravity.

2. The probe as claimed in claim 1, wherein the profile of the outer groove is rectangular.

3. The probe as claimed in claim 2, wherein the rectangular profile of the outer groove has a height (a) of between 1.5 mm and 4 mm.

4. The probe as claimed in claim 3, wherein the rectangular profile of the outer groove has a height (a) of 3 mm.

5. The probe as claimed in claim 2, wherein the rectangular profile of the outer groove has a depth (b) of between 3 mm and 7 mm.

6. The probe as claimed in claim 5, wherein the rectangular profile of the outer groove has a depth (b) of 4.5 mm.

7. The probe as claimed in claim 6, wherein a rounded profile of the inner groove has a diameter (d) of between 2 and 5 mm.

8. The probe as claimed in claim 7, wherein a rounded profile of the inner groove has a diameter (d) of 3.2 mm.

9. The probe as claimed in claim 1, wherein the profile of the inner groove is rectangular.

10. The probe as claimed in claim 9, wherein the profile of the rectangular inner groove has a height of between 2 mm and 5 mm.

11. The probe as claimed in claim 1, wherein the gap comprises a substantially straight first part, having a width (f) of between 1 mm and 5 mm, between a part of the gap emerging into open air and the outer groove.

12. The probe as claimed in claim 11, wherein the first part of the gap has a width (f) of 1.2 mm.

13. The probe as claimed in claim 1, wherein the gap comprises a substantially straight second part, between the outer groove and the inner groove, having a width (c) of between 0.5 mm and 1 mm.

14. The probe as claimed in claim 13, wherein the second part of the gap has a width (c) of 0.65 mm.

15. The probe as claimed in claim 1, wherein the gap comprises a substantially straight third part, forming the chicane, positioned between the inner groove and a fourth part of the gap in contact with mechanical elements of a movable shaft allowing the rotation thereof, said third part having a width (e) of between 0.5 mm and 1 mm.

16. The probe as claimed in claim 15, wherein the third part of the gap has a width (e) of 0.65 mm.

* * * * *